United States Patent

[11] 3,584,697

| [72] | Inventors | Claes Otto Sigfrid Danielson<br>Malmö;<br>Hans-Ake Christian Gram, Hälsingborg,<br>both of, Sweden |
|---|---|---|
| [21] | Appl. No. | 760,328 |
| [22] | Filed | Sept. 17, 1968 |
| [45] | Patented | June 15, 1971 |
| [73] | Assignee | Helsingborgs Spikfabriks AB<br>Hälsingborg, Sweden |
| [32] | Priority | Sept. 29, 1967 |
| [33] | | Sweden |
| [31] | | 13,392/67 |

[54] MACHINE FOR PORTIONING OUT ARTICLES BY WEIGHT
9 Claims, 6 Drawing Figs.

[52] U.S. Cl. ............................................. 177/59,
     177/122, 177/210, 53/126, 53/148, 53/236
[51] Int. Cl. .......................................... G01g 13/16,
     G01g 13/08, B65b 35/58
[50] Field of Search.......................................... 53/126,
     148, 236; 177/52, 53, 59, 210

[56] References Cited
UNITED STATES PATENTS

| 1,080,435 | 12/1913 | Gamper.................. | 53/236 |
|---|---|---|---|
| 2,581,042 | 1/1952 | Otto ....................... | 53/236 |
| 2,602,942 | 7/1952 | Otto ....................... | 53/236X |
| 2,864,215 | 12/1958 | Hillman.................... | 53/126X |
| 2,950,894 | 8/1960 | Hillman.................... | 53/126UX |
| 2,983,088 | 5/1961 | Stoeckel et al. ............. | 53/126X |
| 2,996,863 | 8/1961 | Odell....................... | 53/236 |
| 3,189,110 | 6/1965 | Yarborough ................ | 177/81 |
| 3,308,600 | 3/1967 | Erdmann et al. ............. | 53/236 |

FOREIGN PATENTS

| 315,620 | 11/1919 | Germany................... | 53/148 |
|---|---|---|---|
| 369,369 | 3/1932 | Great Britain............... | 177/210 |
| 780,028 | 7/1957 | Great Britain............... | 177/210 |
| 830,528 | 3/1960 | Great Britain............... | 53/236 |

*Primary Examiner*—Robert S. Ward, Jr.
*Attorney*—John Lezdey

ABSTRACT: A machine for portioning out nails, screws or like articles of magnetically attractable material from a supply of such articles to an outlet where the articles are packaged, has conveyors and a weighing machine cooperating with them for rapid portioning out of definite article portions minus a small number of articles which at the end of the rapid portioning operation are portioned out individually by the weighing machine for supplementing said definite portion, a magnet chute for orienting articles falling through the chute from the weighing machine or from a conveyor cooperating with said weighing machine, and a packaging unit for packaging the article portions in cartons or boxes.

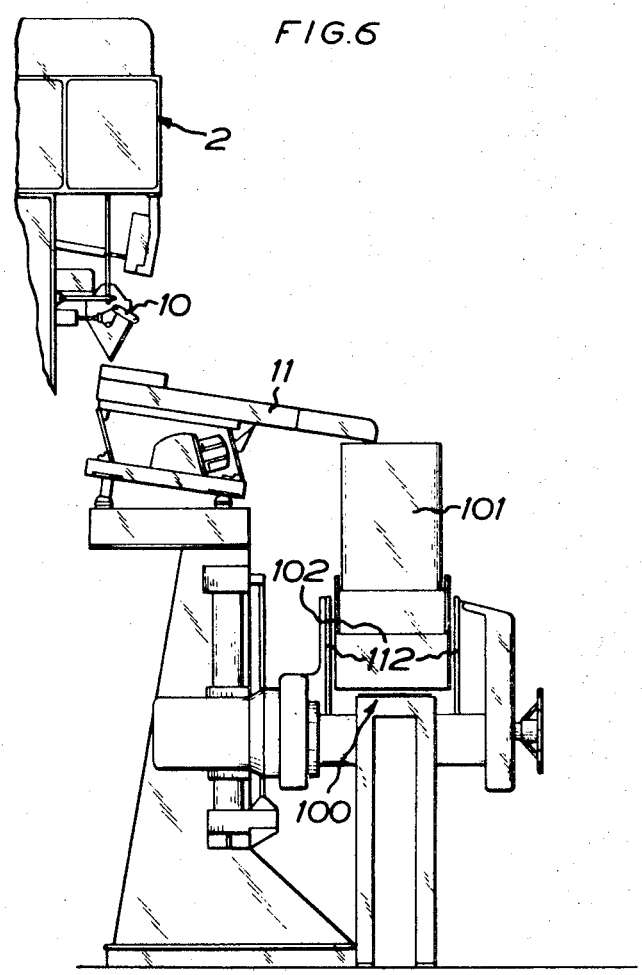

MACHINE FOR PORTIONING OUT ARTICLES BY WEIGHT

This invention relates to a machine for portioning out nails, screws or like articles from a supply of such articles to an outlet of the machine for subsequent packaging.

As the invention is directed primarily to the packaging of nails, screws and like metal products and has for its object to provide a machine that effects the preliminary operations in an efficient and economical manner to facilitate the subsequent packaging of the products, it will be of interest to study the prior art, particularly in the nail packaging industry, to make it possible to judge of the prerequisites of the invention.

In a previously known and usual method, nails are transferred from a supply to a station where boxes are filled one or more at a time through a filling fixture which is placed over and partly depending into the boxes. The nails are caused to fall into the boxes through narrow passages in the filling fixture in order to be oriented in their free fall, and to provide a better volumetric efficiency the boxes are subjected to horizontal vibration during filling. The quantity of nails is determined by either automatic or manual weighing. The filled boxes are then handled in different ways for closing them, assembling them into larger lots, etc.

In another previously known method, nails are fed via shaking troughs into low filling fixtures which supply the nails to underlying sheet metal chutes which are emptied manually into boxes or cartons. After manual weighing the boxes or cartons are sealed and carried away. The chutes can be arranged for magnetization to orient the nails.

To provide the best possible volumetric efficiency of the boxes or cartons and uniform positioning of the nails therein, vibration is usually carried out during filling. By the vibration nails may be thrown out through the end walls or sidewalls of the cardboard or corrugated board boxes. To eliminate this risk the filling fixture can be provided with protective plates which are inserted along the vertical inner sides of the box during filling, or the nails can be supplied to a sheet metal chute and be filled manually into the boxes, thereby eliminating the risk of nails being forcefully ejected. All these methods, however, are impractical and labor consuming.

The previously known nail-packaging systems are nonacceptable inter alia because of the lack of suitable equipment for dosing suitable amounts of wire nails and filling the nails into boxes and because the weighing machines hitherto used and having an acceptable weighing range are not capable of preventing the tendency of the nails to stack. For this reason one has considered the possibility of realizing greater exactitude by the use of several synchronized weighing machines for dispensing small readily handled nail portions but in this case there is the risk that the weighing error will multiply with the number of weighing machines so that the brought-together nail portions will be nonacceptable.

The machine hitherto considered as the best one for weighing and filling of nails is a machine which has been developed primarily for dosing small amounts of screws and nuts and which briefly comprises a main silo, a primary shaking trough, an intermediate supply for controlling the main feed, three individually controlled distributing chutes and a weighing mechanism. The feed to this machine takes place by vibration. The primary feed chute which serves to supply the articles from the main silo and is hydraulically driven has a capacity exceeding the maximum requirements of the weighing mechanism. From the intermediate supply the articles are advanced into a short feed chute for any desired distribution to the three distributing chutes utilized for the final supply of the articles to the weighing machine. Said three distributing chutes are arranged for a coarse, intermediate and fine feed and their positions are regulated by the lever of the weighing machine. As the predetermined weights are attained the respective shaking trough ceases to shake and at the same time a door is closed at the end of the chute to prevent unnecessary overweight. A special device is provided to ensure that the fine feed chute is constantly filled with articles. The three feed chutes open into a scale pan which is suspended on the lever of the weighing machine and the upper portion of which is of such a shape that the free fall of the articles does not noticeably affect the weighing operation. This machine is relatively complicated, sensitive to disturbances and expensive. Besides it does not operate as rapidly as is desired and does not solve the problem of how to transfer the articles in a simple and safe manner from the weighing machine to the packaging station so that the article amounts are delivered in a state facilitating their introduction into the cartons or boxes.

The present invention aims at overcoming the disadvantages outlined in the foregoing and to this end provides a machine for portioning out definite portions of nails, screws or like articles from a supply of such articles to an outlet of the machine, comprising a supply unit, a weighing unit and a receiving apparatus as well as a device for feeding the articles from the supply unit to the weighing unit and from the weighing unit to the receiving apparatus. Characteristic of this machine is that the weighing unit includes an adjustable weighing machine which is of a type previously known in weighing and portioning apparatus and adapted to weigh and deliver the received articles in portions to the receiving apparatus so that each portion contains a number of articles corresponding to a weight exactly determined by presetting of the weighing machine, and the receiving apparatus includes a device having means for orienting and assembling the articles in each portion to a compact set suitable for packaging and for advancing said set to the outlet of the machine for subsequent packaging.

A particularly advantageous embodiment of the machine according to the invention in which the receiving apparatus includes a chute and means for magnetically catching nails, screws or other articles of magnetic material in positions in which the articles extend transversely of the chute between the sidewalls thereof, and a swing arm for pressing the articles to the bottom of the chute, is characterized by a motor-driven push member which is supported at an end portion of the chute and reciprocable along a guide disposed in said chute for said push member for compacting the articles in each portion of such articles dispensed by the weighing machine to the chute, in a space defined between the bottom of the chute and the swing arm when said arm is swung down into the chute for pressing down the articles therein, and for advancing the articles in said space to the other end of the chute which end forms said outlet so that each article portion is delivered in the shape of an essentially compacted bunch for the subsequent packaging thereof.

Further features of the invention will become apparent from the following where the invention is more fully described with reference to the accompanying drawings in which:

FIG. 6 is a rear end view of part of the machine shown in FIG. 5.

Figure 1:
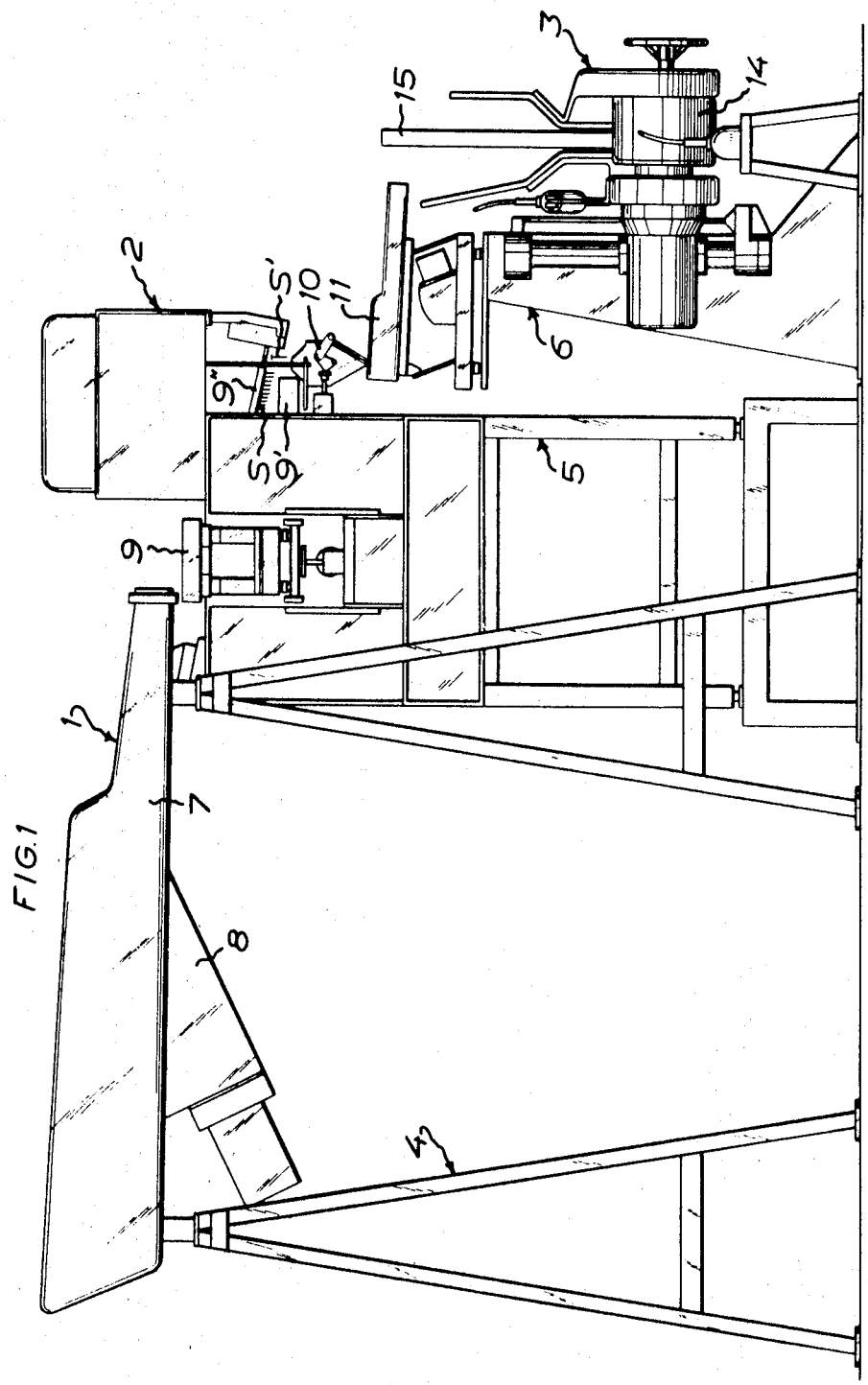
FIG. 1 is a partly diagrammatic side elevational view of a preferred embodiment of the machine according to the invention.

The machine illustrated in FIG. 1 comprises a supply unit 1, a weighing unit 2 and a nail-receiving apparatus 3 which units are carried each by a frame 4, 5 and 6, respectively. The supply unit 1 mainly incorporates a container or conveyor 7 supported by the frame 4 and having a vibrating device 8 for feeding nails to a conveyor 9, for example in the form of vibratory chutes which are carried by the frame 5 and are adapted to transfer the received nails at 9' to the collecting means 10 of the weighing machine 2 which after weighing of the received nails discharges them in weighed portions, for which the weighing machine is set, from the collecting means 10 which is in the form of a bucket and arranged to empty the nail portions onto a conveyor 11 which in turn carries the nail portions to the receiving apparatus 3 which orients the nails in each portion into parallel relationship, and after that the nail portions are assembled into a nail bunch suitable for packaging which is finally discharged to the outlet end of the receiving apparatus 3.

The weighing machine 2 is an electronic weighing machine improved by the present invention. It was originally developed for quite another purpose than the weighing of nails, but after being modified to suit the invention it is very well adapted also for this purpose. The weighing machine operates very rapidly but at the same time very exactly and is adapted to realize rapid collection of nails to a portion which is of a weight somewhat lower than that for which the weighing machine is set. The weighing machine is provided with a device for individual advance of some further nails until the correct weight has been reached. The last mentioned device includes a pair of rotatably mounted parallel rods 9" which define an open channel in which nails are advanced hanging between the rods in that said rods are rotated with the aid of a motor. The rods thus function as a screw conveyor. FIG. 1 shows how nails 5 are advanced between the rods 9" and also how an outermost nail S' in the row of nails is let down into the bucket 10 for supplementing the nail portion therein. When the correct weight has been reached the remaining nails in the channel are retained between the rods 9" in that the outermost nails are blocked with the aid of clamping means (not shown) which is operated by a photocell device actuated by the weighing machine at full weight, whereupon a discharge mechanism is actuated for discharging the nail portion weighed from the bucket 10 to the conveyor 11 which like the conveyors 7 and 9 is constituted by a conventional vibratory chute.

The receiving apparatus 3 includes a chute 12 substantially of U-shaped cross section but the vertical sidewalls of the chute merge at the top into inclined sidewalls 13 for guiding nails into the chute. The sidewalls of the chute are of magnetizable metal and the chute is magnetizable by means of an electric magnetizing apparatus generally designated 14 so that upon connection of the magnetizing apparatus 14 one sidewall will be the north pole and the other sidewall the south pole. Upon supply of nails to the chute with the magnetizing apparatus connected the nails are caused to position themselves transversely of the chute whose sidewalls are relatively adjustable to permit adjusting the width of the chute to different nail lengths.

Figure 2:
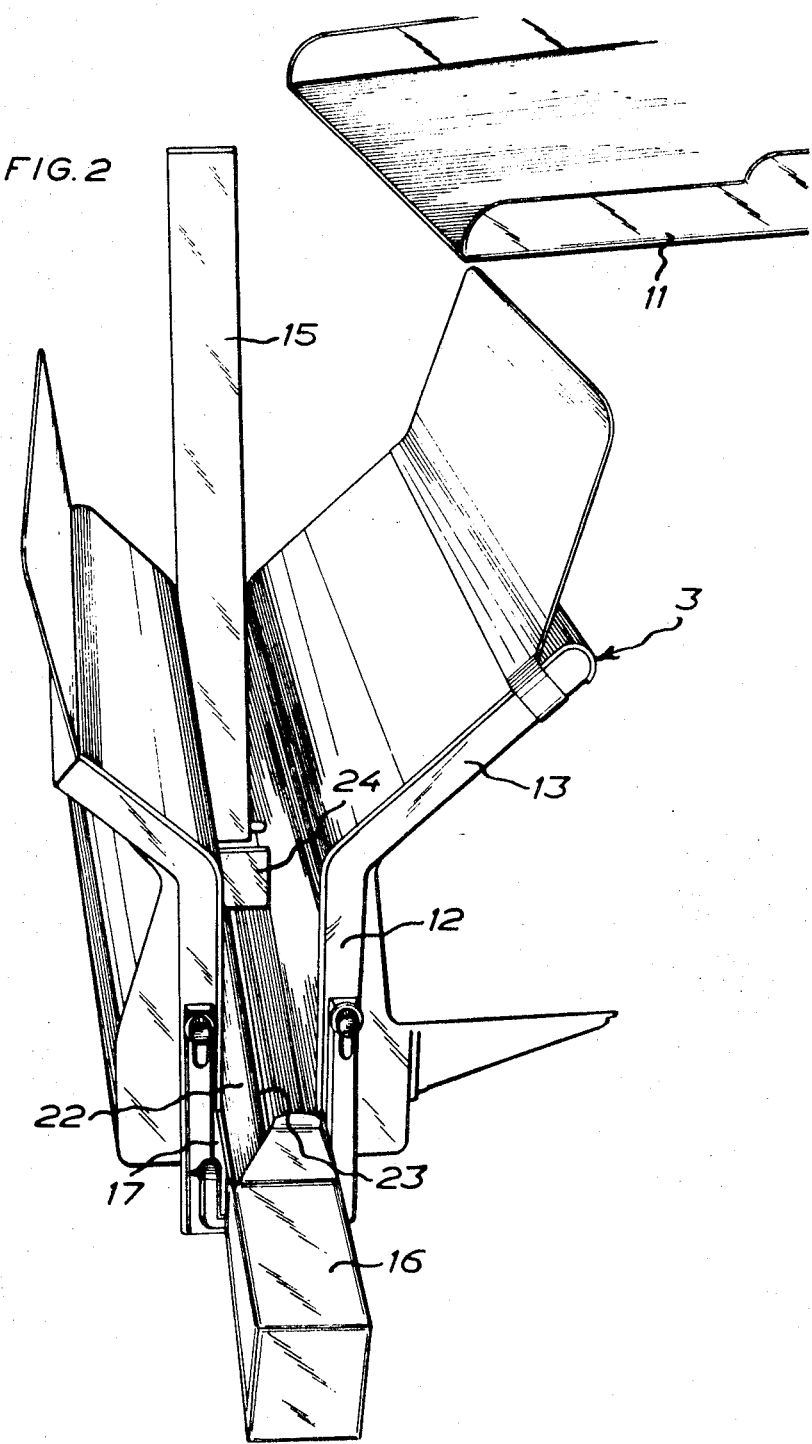
FIG. 2 is a perspective view of the receiving apparatus of the machine.
Figure 3:
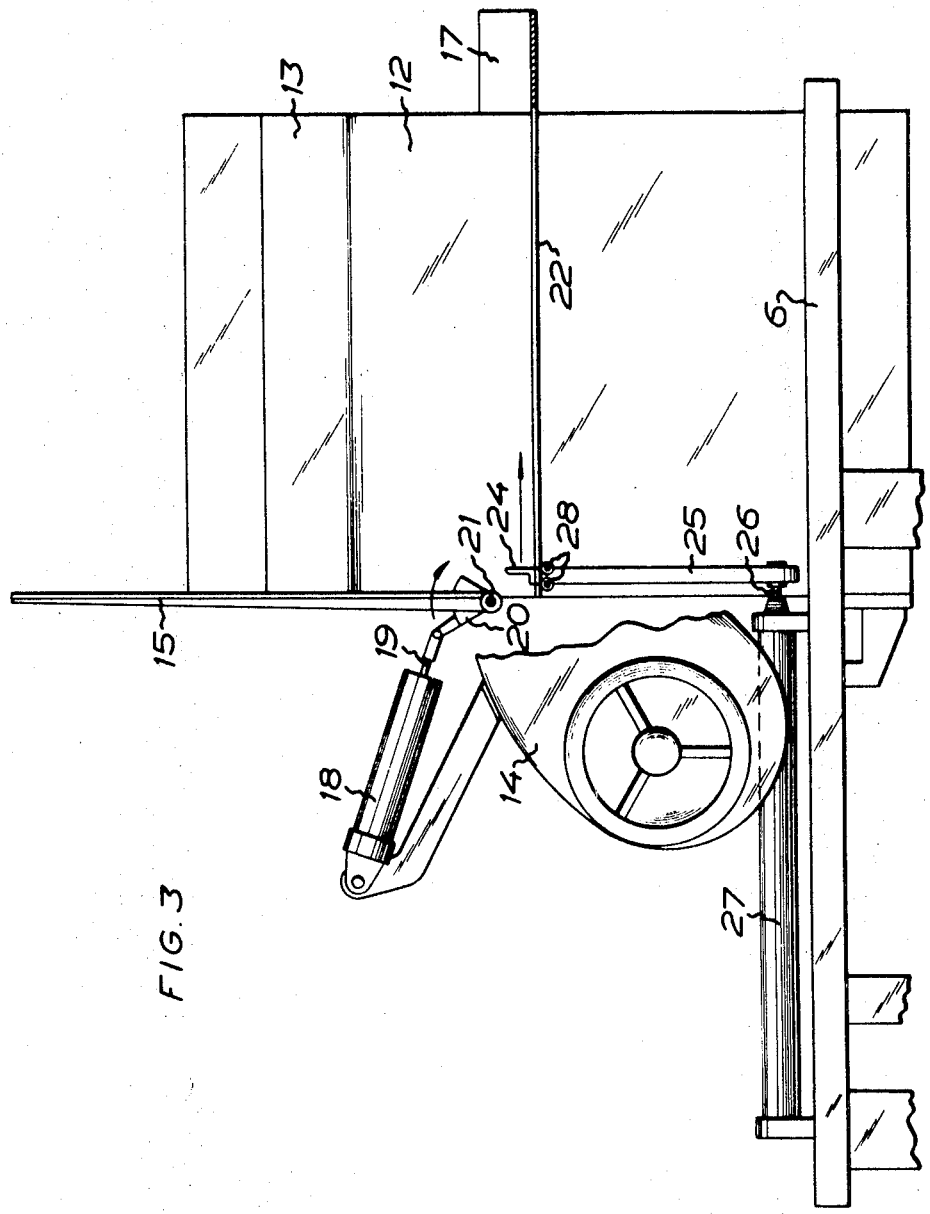
FIG. 3 is a vertical longitudinal sectional view of the apparatus in FIG. 2.

As shown in FIGS. 1—3 the rear end of the chute has a swing arm 15 mounted thereto. From a substantially vertical position said swing arm can be swung down into the chute for pressing nails supplied to the chute against the bottom thereof in preparation of the delivery of each nail portion to a nail carton 16 placed on a discharge nozzle 17 at the front end of the chute.

The swing arm 15 can be swung by means of a piston and cylinder unit 18 mounted on the frame 6 and operated by air under pressure. Said unit can be controlled with the aid of a conventional operating mechanism in the form of an operating valve or electrically, if a solenoid valve is employed. The piston in the cylinder 18 is connected over a piston rod 19 to a crank mechanism 20 which is fixedly connected to the arm 15 and which like the arm 15 is mounted on a pivot 21 disposed at the rear end of the chute 12.

The bottom 22 of the chute has a longitudinal central guide slot 23 (see FIG. 2) for a push member 24 which is carried on the upper end of a vertical operating arm 25 which has the lower end connected with the piston rod 26 of a pneumatic piston and cylinder unit 27. The operating arm 25 carrying the nail push member 24 is guided at the underside of the bottom of the chute with the aid of rollers 28, and the lower end portion of the push member 24 is guided in the guide slot 23 in the bottom of the chute.

The chute 12 may be arranged for magnetization in such a manner that the magnetizing apparatus 14 is initiated when the arm 15 is swung upwards into its vertical initial position (see FIG. 3), whereupon magnetization is interrupted when the arm 15 when swung forwards and downwards from the initial position reaches an abutment, for example the upper end of the push member 24, in which position the arm 15 extends parallel with the bottom of the chute spaced a distance therefrom corresponding to the height of the push member 24. The push member 24 is advanced by the power unit 27 in the space between the bottom 22 of the chute 12 and the arm 15 swung into horizontal position and then serves to advance a set of nails which has been supplied to the chute and pressed down by the arm 15 towards the delivery end of the chute.

The piston and cylinder units 18 and 27 are connected in a known manner to a source of air under pressure and can be arranged to be manually controlled from a common operating panel at the delivery end of the receiving apparatus 3. This operating panel can also include means for controlling the operation of the weighing machine 2, the magnetizing apparatus 14 and the conveyors 7, 9 and 11. However, many modifications of the control means are conceivable withing the scope of the invention, according as it is desired to use mechanically operable valves or for example solenoid valves, and according as it is desired to have manual, semiautomatic or all-automatic control. The power unit 18 for the swing arm 15 can be arranged for example for manual control from said operating panel for downward and upward pivotment of the arm 15, while the power unit 27 for the push member 24 can be arranged to be guided by the pivot movement of the swing arm 15 so that the push member 24 is advanced when the swing arm 15 during the downward pivotment strikes and actuates an abutment which for example, as already mentioned, is the push member 24 itself or another means such as a limit switch, and is retracted when the arm 15 is swung back to vertical position. A further possibility is via electrical control means or otherwise to connect operating valves for the power units 18, 27 and if desired also for the weighing machine 2 and the conveyors to an automatic packaging machine which actuates these control means by pulses.

In the embodiment illustrated in FIG. 3 it is assumed, however, that packaging take place at the front end of the unit in that each nail portion supplied to the chute 12 from the weighing machine 2 and, after downward pivotment of the arm 15, moved forward by the push member 24 in the space between the arm 15 and the bottom of the chute to the delivery end thereof, is introduced directly into a carton 16 placed on the nozzle 17. Owing to the inertia of the nails and the friction thereof against the bottom of the chute and the arm 15 the nails are brought together in the space between the chute bottom and the arm 15 to a bunch having the shape of said space when the push member 24 is moved forward, whereby packaging of the nail portion in the carton 16 is highly facilitated.

Of course, it is also possible to effect packaging elsewhere than immediately adjacent to the delivery end of the receiving apparatus 3. For example the nail portions can be forwarded from the receiving apparatus 3 to a packaging machine by means of a conveyor or can be delivered to a table for example against an abutment where the nail bunch is grasped and placed or otherwise inserted in a box or carton. The insertion of the nails into the box or carton can take place in a downward direction or at a suitable inclination. Pressing the nails against the bottom of the chute 12 in the described manner by mechanical means and compacting the nails to a bunch, which facilitates the subsequent packaging, has proved very efficient and corresponds in point of rapidity and precision to the rapid and exact weighing and delivery of the nail portions to the receiving apparatus 3 with the aid of the electronic weighing machine 2. Handling the nails in this way is very advantageous irrespective of the manner in which the packaging proper is realized.

Figure 4:
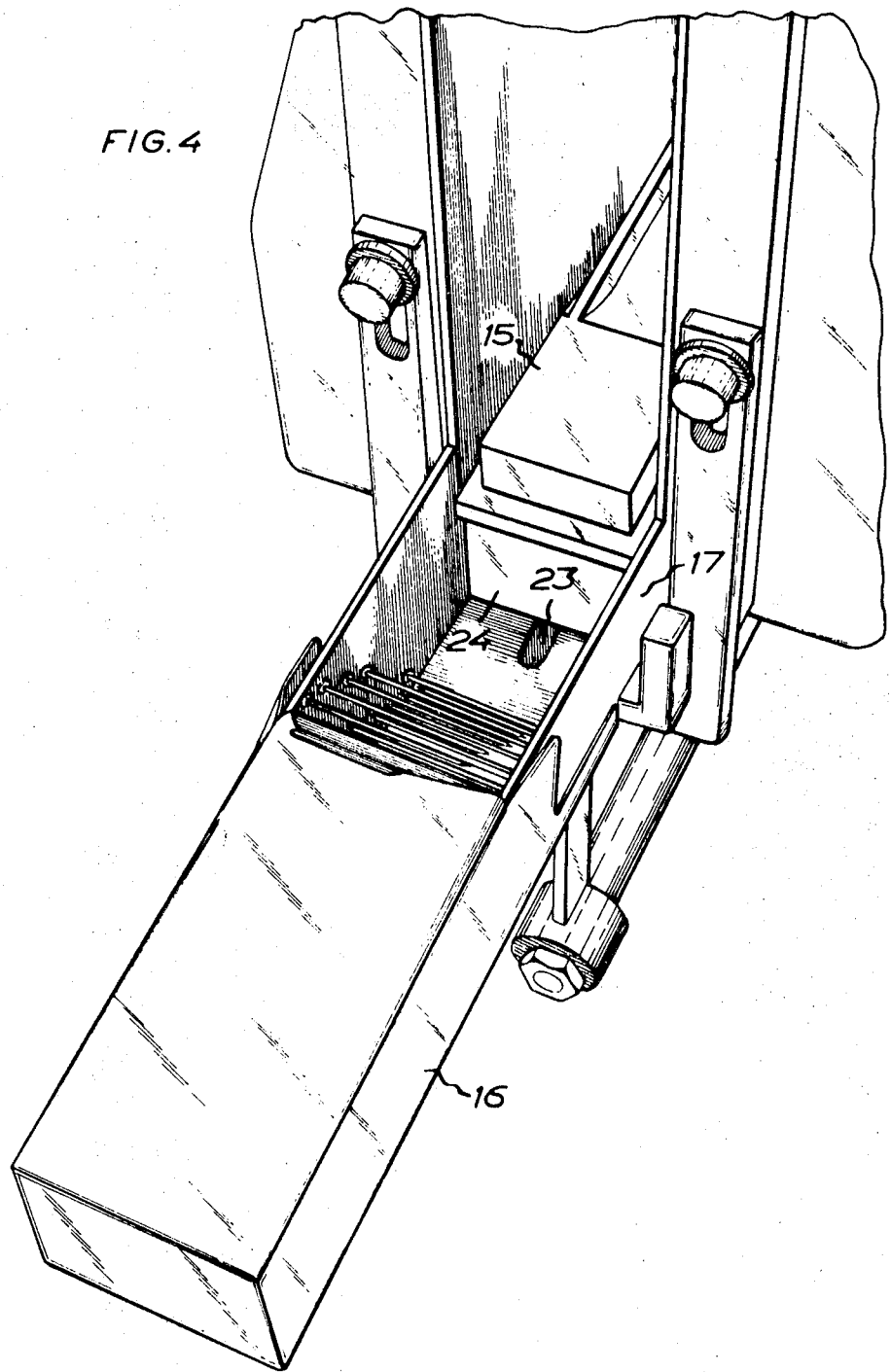
FIG. 4 is a fragmentary perspective view of the delivery end of the apparatus in FIGS. 2 and 3.

In FIG. 4 the swing arm 15 and the push member 24 are shown in the positions they occupy when a nail portion has been moved forward through the nozzle 17 at the front end of the chute to an open carton 16 which is passed onto the nozzle 17. For illustrative purposes there are shown in the chute some nails which have not as yet been introduced into the carton 16. These nails can be introduced manually into the carton 16 or can be supplied to it with the aid of the push member 24 in that said member is advanced some further distance from the position shown in FIG. 4. Another possibility of facilitating the introduction of the nails from the receiving apparatus 3 into the carton 16 is to incline the nozzle 17 so that the insertion of the last nails of each portion takes place or is facilitated by gravity. To this end the nozzle 17 can be mounted in inclined position or the nozzle can be pivotally mounted to permit being inclined whenever necessary, the inclination thereof being effected manually or automatically. In the last mentioned case the nozzle can be inclined directly or indirectly, for example by means of the push member 24.

The power units 18 and 27 illustrated in the drawings may of course be hydraulic motors instead of pneumatic motors, through the latter motors are preferred. Also other details such as the design of the chute 12, arm 15 and means 17, 24 and 25 can be modified in various ways within the scope of the appended claims.

Figure 5:
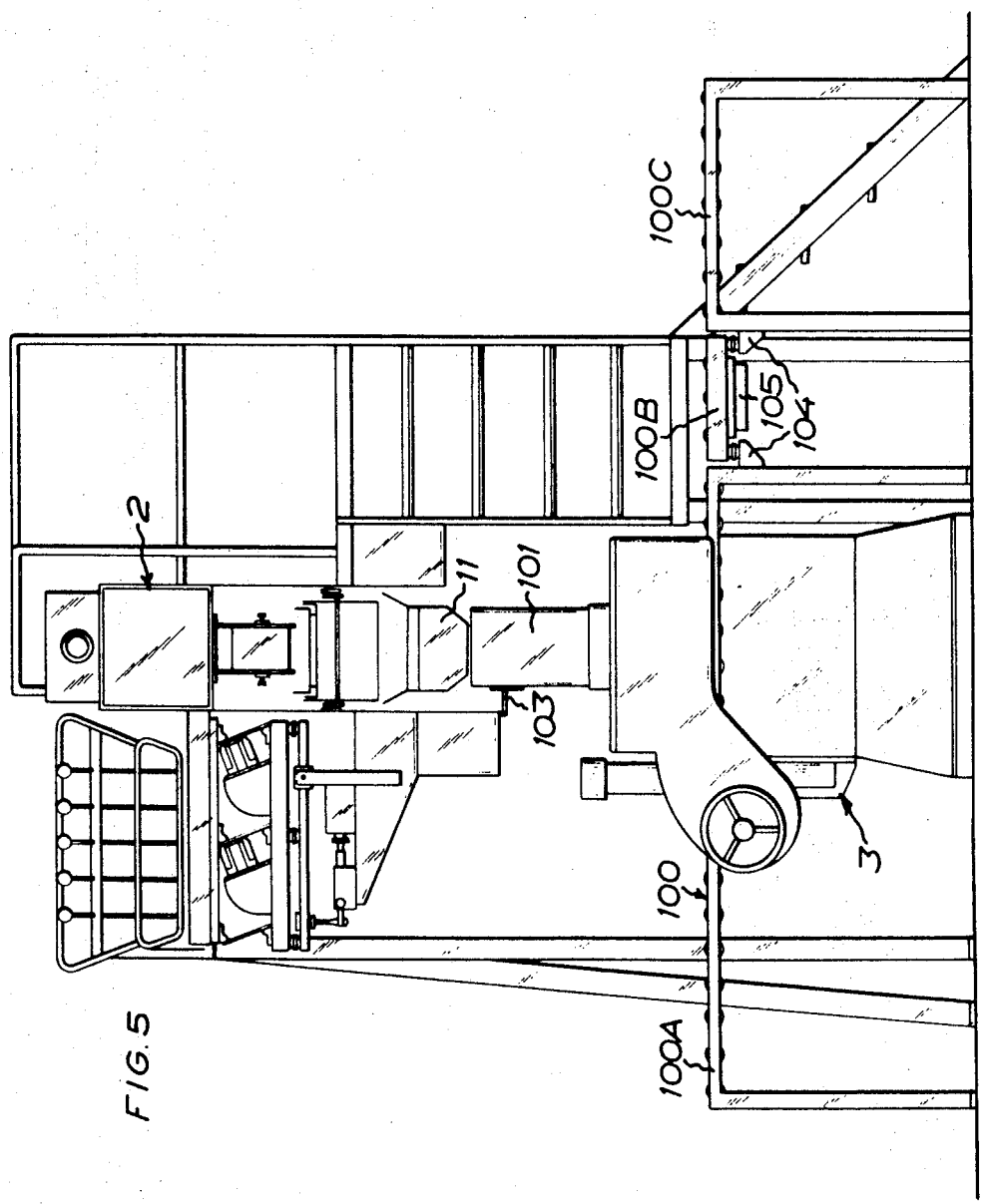
FIG. 5 is a side elevational view of a machine according to the invention for packaging nails in large packages in boxes or crates.

The machine illustrated in FIGS. 5 and 6 mainly corresponds to the earlier described machine except as far as the receiving apparatus is concerned. The machine has no swing arm 15 and means cooperating therewith as has the machine shown in FIGS. 1 to 4. Instead of the magnet chute 12 shown in FIG. 2, which is substantially closed at the bottom, the machine shown in FIGS. 5 and 6 has a magnet chute comprising two parallel electrically magnetizable plates 112 and a bottom formed by a horizontal conveyor 100 such as a roller type conveyor which extends a fair distance out of the magnet chute 112 at both the rear and front end thereof. The nails which are delivered from the weighing machine 2 to the conveyor 11 are guided from the outer end of the conveyor 11 by means of a hopper or funnel 101 to a box or carton 102 placed in the magnet chute on the horizontal roller type conveyor 100. The funnel 101 can be arranged so that after arrival of a carton 102 in the position shown in FIGS. 5 and 6 said funnel can be lowered manually or automatically into the carton preferably to the bottom thereof, and so that after the carton has been filled said funnel can be retracted in the same way.

The funnel 101 can be detachably carried by the machine frame with the aid of a holder 103.

As a nail portion is filled into the carton 102 the nails in the manner of small magnets will arrange themselves in a row in said carton orienting themselves transversely thereof. After the carton 102 has been filled altogether it is vibrated on the conveyor 100 before it is sealed. To permit such vibration of the carton the conveyor 100 is divided into three longitudinal sections 100A, 100B, 100C. The section 100B which follows upon the magnet chute is movably carried on brackets 104 on which the section can be vibrated with the aid of a magnetic or electric vibrator 105. The nail carton is conveyed from the vibrator 105 on the roller type conveyor 100C to a delivery station.

To protect a carton 102 also during its vibration the funnel 101 or the lower portion 101' thereof can be adapted to follow the carton 102 to the vibratory section 100B of the conveyor 100. The funnel or the lower portion 101' thereof can then be returned by hand or by means of a returning mechanism (not shown).

In the embodiment illustrated in FIGS. 5 and 6 use is made of substantially the same kind of weighing machine 2 as in the embodiment according to FIGS. 1—4. The weighing machine of FIGS. 5 and 6, however, is adapted for dispensing larger packages, for instance packages of the size of 30—50 kg.

The machine according to the invention can preferably be utilized also in connection with the packaging of screws, bolts, nuts and other metal articles. The weighing, portioning, orientation and collection of screws of course can be effected in the same way as that described for nails. When the packaging of for instance nuts or like articles is concerned the machine can be employed without any major modifications in substantially the same way as has been described in the foregoing, i.e. the article portions can be advanced in a chute 12 of a construction suitable for the article concerned to a delivery station, and depending on the shape of the article and on how the packaging proper is to be effected the collection of the articles to a more or less compact bunch may be of subordinate importance without ensuing invalidation of the advantages provided by the weighing machine 2 and the dispensing means.

What we claim and desire to be secured by Letters Patent is:

1. A machine for portioning out definite portions of nails, screws and like articles from a supply of such articles to an outlet of said machine, comprising supply means, weighing means, receiving means including a magnetizable chute, for receiving, orienting and bringing together the articles in a portion to a compact set suitable for packaging and for advancing said set to the outlet of the machine for subsequent packaging, and feed means for feeding said articles from said supply means to said weighing and from said weighing means to said receiving means, wherein said feed means includes a high-speed feeder means for rapid feed of articles and a fine feeder means for individual feed of the articles at the point of feed of said articles and said weighing means includes an electronic weighing machine connected to said high-speed feeder means and said fine feeder means and adapted to stop the high-speed feeder means immediately before the feed of the definite portion weight adjusted so as to permit said fine feeder means to feed further articles individually until the exactly adjusted portion weight has been reached and thereby stop said fine feeder means.

2. A machine as claimed in claim 1, wherein said fine feeder means includes two relatively rotatable elements adapted during the rotary movement to advance articles in a space between them and to stop said advance when said rotary movement is stopped.

3. A machine as claimed in claim 2, wherein said relatively rotatable elements are two rods which are carried at an adjustable distance from one another and are adapted to support a row of articles in hanging position between said rods for advance and discharge of one nail at a time during the rotation.

4. A machine as claimed in claim 1, wherein said receiving means includes a swing arm cooperating said magnetizable chute for pressing the articles down against the bottom of said chute, and a motor-driven push member carried at one end portion of said chute for pushing together the articles in each article portion supplied to the chute from the weighing means when said arm is swung down into said chute for pressing down the articles, and for advancing the articles in said space to the other end of the chute, which other end constitutes said outlet, for delivery of each article portion in the form of a substantially compacted bunch for the subsequent packaging operation.

5. A machine as claimed in claim 4, including a motor for said swing arm operable by means of an operating mechanism located at the outlet of said machine.

6. A machine as claimed in claim 5, wherein said swing arm is adapted, when swung down into the chute, to actuate a means connected to said motor of said push member to cause said motor to advance said push member in said chute, and, when swung up from the chute, to actuate said motor to return said push member.

7. A machine as claimed in claim 4, wherein said swing arm is adapted to deliver an activating or deactivating impulse to a magnetizing apparatus for said chute.

8. A machine as claimed in claim 1, including control means for impulse transmission to a conveyor assembly and said weighing means in step with the packaging of article portions delivered at the outlet of said machine.

9. The machine as claimed in claim 1, wherein said weighing means is adjustable.